United States Patent
Tanaka

(10) Patent No.: US 7,339,692 B2
(45) Date of Patent: Mar. 4, 2008

(54) PRINT ORDER SYSTEM, PRINTING SYSTEM, ORDER TERMINAL, AND PROGRAM

(75) Inventor: Keisuke Tanaka, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 979 days.

(21) Appl. No.: 10/447,942

(22) Filed: May 30, 2003

(65) Prior Publication Data

US 2003/0231340 A1 Dec. 18, 2003

(30) Foreign Application Priority Data

May 30, 2002 (JP) .............................. 2002-157434

(51) Int. Cl.
G06F 15/00 (2006.01)
G06F 15/16 (2006.01)

(52) U.S. Cl. ...................... 358/1.15; 710/33; 709/203; 709/219

(58) Field of Classification Search ............... 358/1.15; 710/33; 709/203, 219
See application file for complete search history.

(56) References Cited

U.S. PATENT DOCUMENTS

| 6,715,003 B1* | 3/2004 | Safai ............................. 710/33 |
| 7,016,868 B1* | 3/2006 | McIntyre et al. ............. 705/27 |
| 2003/0164852 A1* | 9/2003 | Simpson et al. ............ 345/748 |

* cited by examiner

*Primary Examiner*—Douglas Q. Tran
*Assistant Examiner*—Chan S. Park
(74) *Attorney, Agent, or Firm*—Birch, Stewart, Kolasch & Birch, LLP

(57) ABSTRACT

When an order for printing image data is placed via a network, a wrong agency or a wrong recipient can be prevented from being designated. A print order is placed by sending order information and image data to a DPE store. The order information includes recipient information. An order reception server refers to a table stored in a database for representing an order reception area of the DPE store, and judges whether or not the place of residence of a recipient is within the order reception area, based on the recipient information. If a result of the judgment is negative, the order reception server sends warning information to a user terminal. In this manner, a warning message notifying a user of the fact that the recipient or the DPE store may be wrong is displayed on a monitor.

10 Claims, 8 Drawing Sheets

FIG.2

| ZIP CODE | ××× -×××× |
|---|---|
| ZIP CODE | ××× -×××× |
| ZIP CODE | ××× -×××× |
| ZIP CODE | ××× -×××× |
| ZIP CODE | ××× -×××× |

| ZIP CODE | ××× -×××× |
|---|---|
| ADDRESS (STATE) | ○○ STATE |
| ADDRESS (CITY,WARD,COUNTY) | □□ CITY |
| ADDRESS (STREET) | △△ STREET |
| PHONE NUMBER | ××××-××-×××× |

RECIPIENT INFORMATION

NAME

[          ] ~20A

ADDRESS (STATE)

[          ]

ADDRESS (CITY,WARD,COUNTY)

[          ]

ADDRESS (STREET)

[          ]

PHONE NUMABER

| TS | SIZES (16A) | QUANTITIES (16B) |
|---|---|---|
| S2 | L | 2 |
| S4 | 2L | 1 |
| S9 | L | 3 |

PRINTING CHARGE = ¥ * *    TIME OF DELIVERY = 2/1 PM 3:00

| GO BACK (16C) | CONFIRM (16D) |

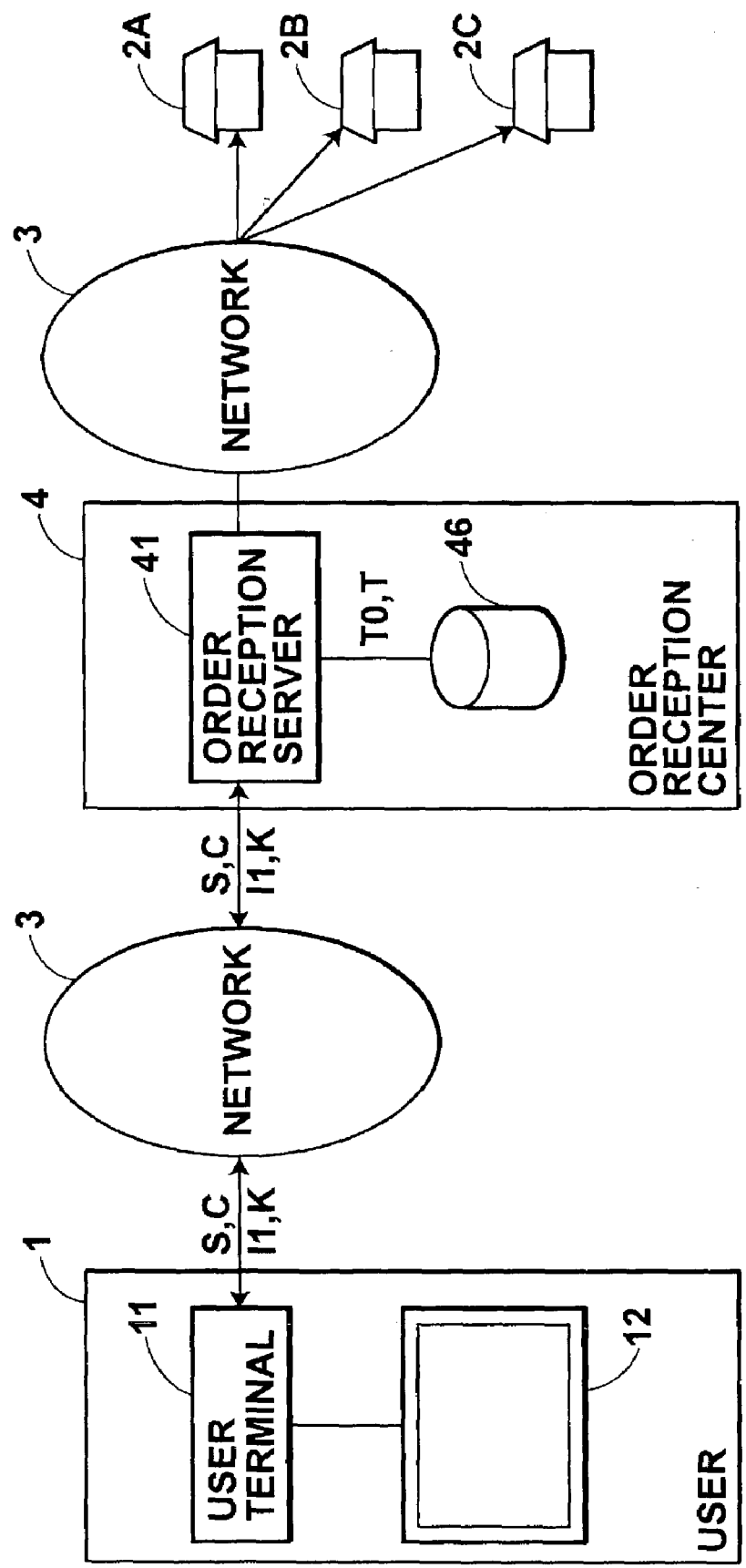

PRINT ORDER SYSTEM, PRINTING SYSTEM, ORDER TERMINAL, AND PROGRAM

BACKGROUND OF THE INVENTION

1. Field of the Invention

The present invention relates to a print order system, a printing system, and an order terminal for placing a print order regarding image data via a network. The present invention also relates to a program that causes a computer to execute the procedures carried out in the printing system.

2. Description of the Related Art

There have been known digital photograph service systems for carrying out various types of digital photograph services such as storing photographs obtained by users in image servers after digitization thereof, recording the photographs in CD-Rs to be provided to the users, printing images photographed by users with digital cameras, and receiving orders for additional prints. As one form of such digital photograph service systems, a printing service system for receiving print orders via a network such as the Internet has also been proposed.

In such a printing service system, a user installs viewer software in his/her personal computer that acts as a user terminal, for reproducing image data recorded in a recording medium such as a CD-R or obtained by a digital camera. The user reproduces images represented by the image data, and generates order information describing the content of an order by using an ordering function built-in to the viewer software if the user wishes to place an order. The user transfers the order information and the image data representing the images to be printed to an order reception server installed in a service center for receiving the order from the user terminal via a network such as the Internet. The order reception server transfers the order information and the image data to a print server installed in a large-scale laboratory for dealing with the order. Printed matter such as additional prints, picture postcards, or a photograph album is then generated in the laboratory, based on the order information.

The printed matter generated in the above manner is delivered or mailed to an agency specified by the user at the time of placing the order. The user visits the agency, and can receive the printed matter by paying a charge at the agency. The user can designate the agency at the time of placing the order, and a desired store or the like close to the place of residence or employment of the user is generally designated as the agency. The image data and the order information are transferred from the order reception server to the laboratory in collaboration with the agency designated by the user.

The user can designate the agency by: (1) selecting the desired agency from a list of agencies displayed on the user terminal; (2) selecting area information such as a prefecture by using the user terminal and then selecting the desired agency from a list of agencies in the selected area displayed on the user terminal; (3) displaying the agency closest to the user on the user terminal, based on the zip code of the user; or (4) directly inputting the name of the agency from the user terminal, for example. In this manner, the user can freely select the agency as desired.

The order information herein referred to is information such as a processing number for specifying the content of a printing service (generation of ordinary prints or picture postcards or the like), an image number for specifying a photograph (a number representing an image data file), a print size, a quantity of prints, specification of printing paper (such as glossy or non-glossy), thickness of the printing paper, the content of photographic processing, and trimming specification, for example. The order information further includes information regarding the name, the address, the zip code and the phone number of the user, for example.

The printed matter generated in the printing service is delivered or mailed to the agency designated by the user at the time of placing the order, and the user receives the printed matter at the agency, as has been described above. If the agency installs a server for receiving the order information and the image data as well as a printer to print the image data, the agency can function as a laboratory. If the agency has the function of a laboratory, delivery of the printed matter to the agency, which is necessary in the case of a large-scale laboratory, becomes unnecessary. Therefore, although the agency is small as a laboratory, the time necessary for providing the user with the printed matter can be shortened.

Meanwhile, in such a printing service system, a user who places a print order may wish another person to receive the printed matter. For example, in the case where a user living in Tokyo wishes to send a photograph (printed matter) of his/her child to his/her parents in Hokkaido, it is more efficient for the user to designate a DPE store or the like in his/her parents' neighborhood as an agency so that the parents can receive the printed matter there at than to mail the printed mater after reception thereof by himself/herself. In such a case, the user designates a DPE store or the like in his/her parents' neighborhood as an agency and notifies his/her parents of the fact. The parents can then receive the photograph at the agency. The user can pay a charge with use of his/her credit card or the like.

However, even if the user places another print order in which the user himself/herself is designated as a recipient after placing a print order wherein the user was not a recipient, the setting of the agency is not changed. Therefore, the agency remote from the user is designated instead of an agency close to the user, and the user may confirm the new order without realizing this fact. In such a case, the user realizes his/her mistake in agency designation after visiting the agency close to his/her home, and the user has to visit the remote agency in order to receive the printed matter. Alternatively, the user needs to place a new order by changing the agency from the remote one to the near one, which is troublesome for the user. Even in the case where the agency has been changed, the data regarding the recipient may not be changed, and another person living away from the designated agency may be designated as the recipient in the new print order.

SUMMARY OF THE INVENTION

The present invention has been conceived based on consideration of the above circumstances. An object of the present invention is therefore to prevent a wrong agency or a wrong recipient from being designated.

A print order system of the present invention is a print order system comprising:

an order reception server capable of receiving, via a network, image data and order information representing the content of a print order regarding the image data and including recipient information representing a place of residence of a recipient of printed matter to be generated according to the content of the print order and/or agency information representing an agency at which the printed matter is received; and an order terminal connected to the order reception server via the network and used for placing the print order regarding the image data by generating the order information and then by sending the order information through an access to the order reception server. The print order system of the present invention is characterized by that:

the order reception server judges whether or not the place of residence of the recipient is within an order reception area of the agency, based on the recipient information, and sends warning information to the order terminal in the case where the place of residence is not within the order reception area, and the order terminal issues a warning based on the warning information.

The agency information is included in the order information in the case where the present invention is applied to a printing service system wherein the print order is placed with an order reception center. The agency information is not included in the order information in the case where the present invention is applied to a printing service system wherein a printing service provider for generating a print has the order reception server so that the printing service provider can directly receive the print order from a user. In the latter case, the printing service provider having the order reception server to which the order information is sent acts as the agency.

The recipient information can be any information representing the place of residence of the recipient. For example, the recipient information may be the zip code, the address, or the phone number of the recipient. The phone number may be an area code or a prefix.

The order reception server is a server computer that is always connected to the network. The order reception server may be installed in an order reception center that dedicatedly receives the print order and sends the order information to a laboratory or a printing service provider. Alternatively, the order reception server maybe installed in a printing service provider that has a photographic printer for printing the image data according to the order information.

The printing service provider refers to a DPE store that the user can visit for receiving the printed matter. Alternatively, the printing service provider may be a laboratory or the like that dedicatedly carries out printing without having a store front to visit and provides the printed matter by delivery or by mail.

The order terminal can be a network-connectable personal computer owned by the user who places the print order regarding the image data, or a network terminal installed in the printing service provider in order to place the print order.

As the image data to be printed, any image data can be used, such as image data obtained by the user with a digital camera, or image data generated by digitization of photographs obtained by the user and provided to the user by being recorded in a CD-R. The image data are transferred from the order terminal to the order reception server together with the order information.

The print order is placed for printing the image data from the photographic printer, for generating a picture postcard or a calendar, and for printing on a T-shirt, a mug cup, a jigsaw puzzle, or a watch-face, for example.

The printed matter such as a print or a picture postcard generated according to the order information may be provided to the user directly by a visit of the user to the agency, or by delivery or by mail from the agency to the user.

The order reception area refers to an area in which the user is thought to be capable of visiting the agency for receiving the printed matter. For example, the order reception area refers to an area having the same street name as the agency or a neighboring street name, an area having the same prefix or area code as the agency or a close prefix or area code, an area having the same zip code as the agency or a neighboring zip code thereof, or an area within a predetermined range from the address of the agency.

Whether or not the place of residence of the recipient is within the order reception area of the agency can be judged by using an order reception area table in which the street name, the prefix, the area code, or the zip code for identifying the order reception area is described. The judgment can be made by confirming whether or not the street name, the prefix, the area code, or the zip code represented by the recipient information is included in the order reception are a table. The judgment can also be made by examining whether or not a distance between the agency and the place of residence is within a predetermined threshold value. The distance between the agency and the place of residence is calculated based on the street name, the prefix, the area code, or the zip code represented by the recipient information, and the distance may be a strict distance based on the addresses of the agency and the recipient. Alternatively, the distance may be a rough distance between centers of the streets or a rough distance calculated based on the zip codes.

The warning information can be any information as long as the information can cause the user who operates the order terminal to realize the possibility of wrong agency or wrong recipient. For example, the warning information may be information for displaying a message notifying the possibility of wrong agency or wring recipient on the order terminal. Alternatively, the warning information may be information for reproducing the message as an audio message with use of the order terminal.

The warning may be the message for notifying the possibility of wrong agency or recipient by display or by audio.

In the print order system of the present invention, the order information may be generated and sent according to a program installed in the order terminal. The program causes a computer to execute the procedures of generating the order information and sending the order information to the order reception server.

Such a program may be provided to the user by being recorded in a computer-readable recording medium such as a CD-R, an FD, or a DVD. Alternatively, the program may be provided to the user through downloading to the order terminal. If the user installs the program in the order terminal, the order terminal can generate and send the order information without special equipment.

In the case where the order reception server is installed in the printing service provider, it is preferable for the recording medium having the program to be recorded with access information used for accessing the order reception server of the printing service provider. The access information can be the URL, the IP address, the phone number, the zip code, or the address of the printing service provider. When the program is installed, the access information is input to the program so that the order reception server can be automatically accessed based on the access information at the time of transfer of the order information.

The recording medium is provided to the user at the time of sale of a digital camera to the user, or at the time of visit of the user to the printing service provider, or on the street, for example.

In this manner, the user who installed the program places the print order with the printing service provider from which the user obtained the recording medium having the program recorded therein. Therefore, the printing service provider can induce the user to become a customer thereof.

A printing system of the present invention is a printing system comprising an or derreception server capable of receiving order information generated by an order terminal for placing a print order regarding image data via a network. The order information includes the content of the print order regarding the image data, in addition to recipient information representing a place of residence of a recipient of printed matter to be generated according to the content of the print order, and/or agency information representing an agency at which the printed matter is received. The printing system is characterized in that the order reception server judges whether or not the place of residence of the recipient is within an order reception area of the agency, based on the recipient information, and sends warning information to the order terminal in the case where the place of residence is not within the order reception area.

The printing system of the present invention may be installed in a printing service provider having a photographic printer for printing the image data according to the order information.

An order terminal of the present invention is an order terminal connected to the order reception server in the printing system of the present invention via the network, and used for placing the print order regarding the image data by generating the order information and then by sending the order information through an access to the order reception server. The order terminal of the present invention is characterized by that the order terminal issues a warning based on the warning information sent from the order reception server.

The procedures carried out in the printing system and in the order terminal may be provided as programs to cause a computer to execute the procedures.

According to the present invention, the order reception server judges whether or not the place of residence of the recipient is within the order reception area of the agency specified in the order information. In the case of a negative result of the judgment, the warning information is sent to the order terminal, and the order terminal issues the warning based on the warning information. Therefore, the user who operates the order terminal can realize the possibility that the agency or the recipient specified in the order information is wrong, based on the warning. In this case, the user checks the order information and can correct the agency or the recipient if the agency or the recipient is wrong. In the case of right agency or recipient, the user does not carry out any correction, or sends information for confirming the order information to the order reception server, for example. Therefore, a mistake in specification of the agency or the recipient can be avoided, before the user visits the agency for receiving the printed matter.

BRIEF DESCRIPTION OF THE DRAWINGS

FIG. 2 shows an order reception area table;

FIG. 3 shows an agency table;

FIG. 7 shows a recipient information setting page;

FIG. 8 shows a confirmation page;

FIG. 11 is a block diagram showing a configuration of a print order system according to a second embodiment of the present invention.

DESCRIPTION OF THE PREFERRED EMBODIMENTS

Figure 1:
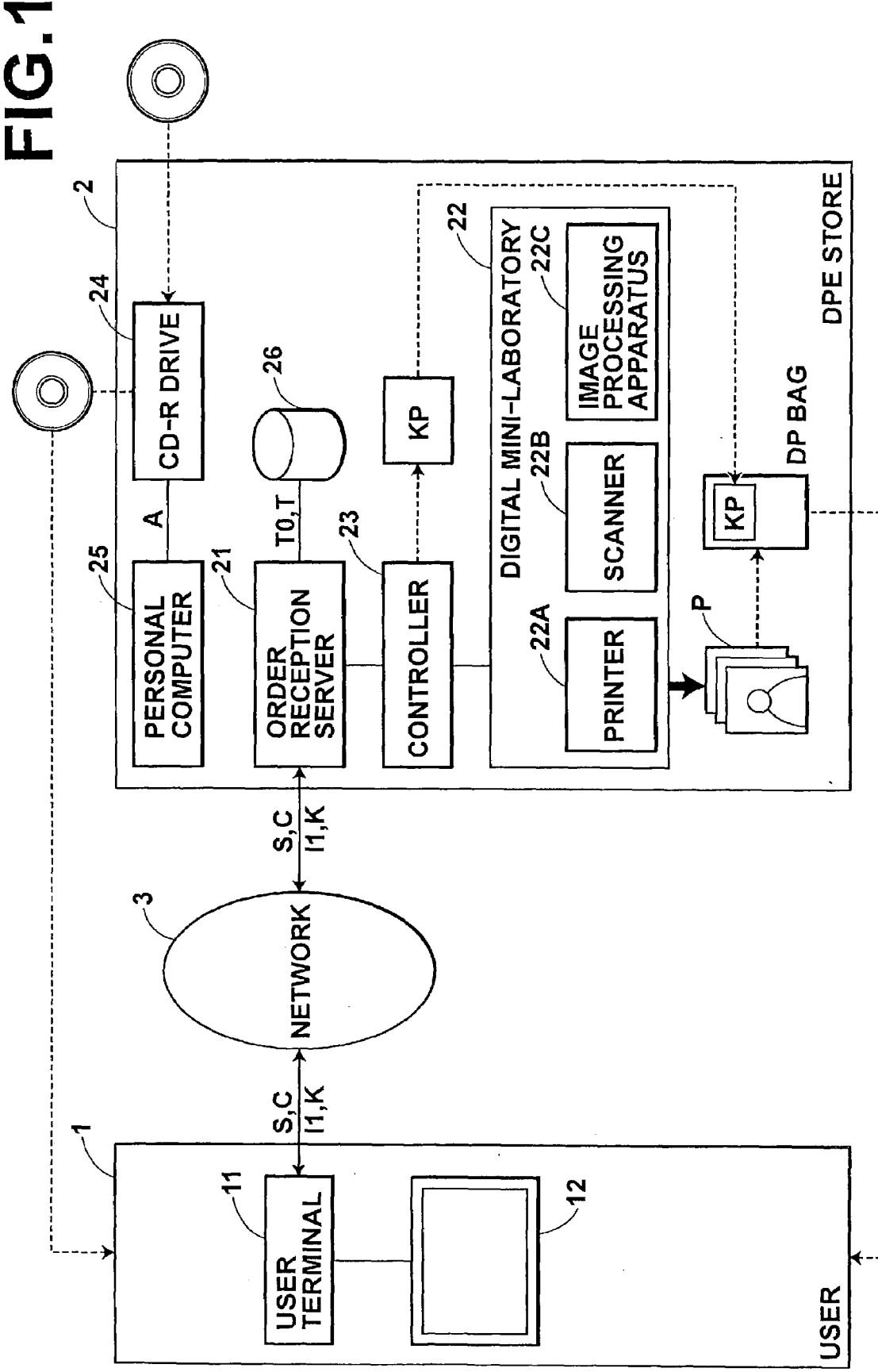
FIG. 1 is a block diagram showing a configuration of a print order system according to a first embodiment of the present invention.

Hereinafter, embodiments of the present invention will be explained with reference to the accompanying drawings. FIG. 1 is a block diagram showing a configuration of a print order system according to a first embodiment of the present invention. As shown in FIG. 1, the print order system in the first embodiment exchanges data, prints, and the like, between a user 1 and a DPE store 2. In FIG. 1, a flow of data is shown by a solid line while a flow of an object is shown by a broken line.

The user 1 has a personal computer that acts as a user terminal 11, and the personal computer comprises a hard disc, a monitor 12, a keyboard, a mouse, a CD-ROM drive, and a PC card slot for reading image data from a recording medium for a digital camera (such as SmartMedia⁰ or CompactFlash⁰). As will be explained later, the user 1 can place a print order with the DPE store 2 via a network 3 such as the Internet. In the case where the user 1 does not have a personal computer, the user 1 can place a print order by using a terminal dedicated to placing orders and installed in a service station or the like.

The DPE store 2 has an order reception server 21 for receiving the print order from the user 1, a digital minilaboratory 22 for obtaining a print or prints P (hereinafter referred to as the prints P) based on an image data set or image data sets S (hereinafter referred to as the image data sets S) sent from the user terminal 11 via the network 3 at the time the print order is placed, a controller 23 for controlling the order reception server 21 and the digital mini-laboratory 22, a personal computer 25 to which a CD-R drive 24 for recording information in a CD-R is connected, and a database 26 for storing an order reception are a table T for specifying an order reception area of the DPE store 2.

FIG. 2 shows an example of the order reception area table T. The order reception area refers to an area in which a recipient is thought to be able to visit the DPE store 2 for receiving the prints P. As shown in FIG. 2, the order reception area table T describes an area having the same zip code as the DPE store 2 and an area of a neighboring zip code. Alternatively, the order reception area table T may describe an area having the same street name as the DPE store 2 in addition to an area having a neighboring street name, or an area having the same prefix of the phone number as the DPE store 2 as well as an area having a close prefix. Furthermore, an area having the same area code of the phone number as the DPE store 2 and an area having a close area code may be described in the order reception area table T, instead of the zip codes. Moreover, an area within a predetermined range of distance from the address of the DPE store 2 may be described as the order reception area in the table T.

The database 26 also has an agency table T0 describing the zip code, the address (the street name, the city name, and the state name), and the phone number of the DPE store 2.

The order reception server 21 has a function of sending DPE store information I1 comprising a menu describing the content of services provided by the DPE store 2 (ordinary printing, special printing such as generation of picture postcards, printing on a T-shirt, printing on a mug cup, and the like), a printing charge, and expected time of delivery to the user terminal 11 in response to or without a request of the user 1 at the time the user 1 accesses the order reception server 21. The order reception server 21 also has a function of storing order information C sent from the user terminal 11 as will be explained later. The order reception server 21 is always connected to the network 3. The order reception server 21 judges whether or not the place of residence of the recipient is within the order reception area of the DPE store 2, with reference to the order reception area table T stored in the database 26 and the zip code of the recipient included in the order information C. In the case where the place of residence is not within the order reception area, the order reception server 21 sends warning information K for displaying a warning message on the user terminal 11.

The digital mini-laboratory 22 comprises a printer 22A for generating the prints P from the image data sets S, a scanner 22B for scanning a negative film, and an image processing apparatus 22C for carrying out image processing on the image datasets S. The digital mini-laboratory 22 also has a function of writing the image data sets S in a recording medium such as a CD-R.

The controller 23 has a computer and a printer. The controller 23 controls and manages the order reception server 21 and the digital mini-laboratory 22, and is operated by an operator in the DPE store 2. The controller 23 outputs a label KP on which the printing charge, the name of the user 1, the content of printing, and an order reception ID corresponding to the order information C are printed, based on the order information C. By pasting the label KP on a DP bag in which the prints P are put, the prints P are easily classified and the user 1 is easily invoiced.

The CD-R drive 24 is connected to the personal computer 25, and records access information A for an access to the order reception server 21 in the DPE store 2 in the CD-R wherein viewer software for displaying images and generating and sending the order information C is recorded. The IP address or the URL of the order reception server 21 is used as the access information A. The CD-R is provided to the user 1 at the time the user 1 purchases a digital camera or visits the DPE store 2, or on the street, for example.

The user 1 sets the CD-R in the CD-ROM drive (not shown) of the user terminal 11, and installs the viewer software from the CD-R in the user terminal 11. At this time, the access information A recorded in the CD-R is input to the viewer software. In this manner, the user 1 can view and manipulate the image data sets S, generate the order information C, and places the print order, with use of the viewer software. At the time the print order is placed, the user terminal 11 accesses the order reception server 21 of the DPE store 2 corresponding to the access information A, and the order information C and the image data sets S to be printed are sent to the order reception server 21 according to the functions of the viewer software. The order information C includes a recipient table describing the zip code, the address (the street name, the city name, and the state name), and the phone number of the recipient of the prints P. The recipient table has the same format as the agency table T0 shown in FIG. 3.

Figure 4:
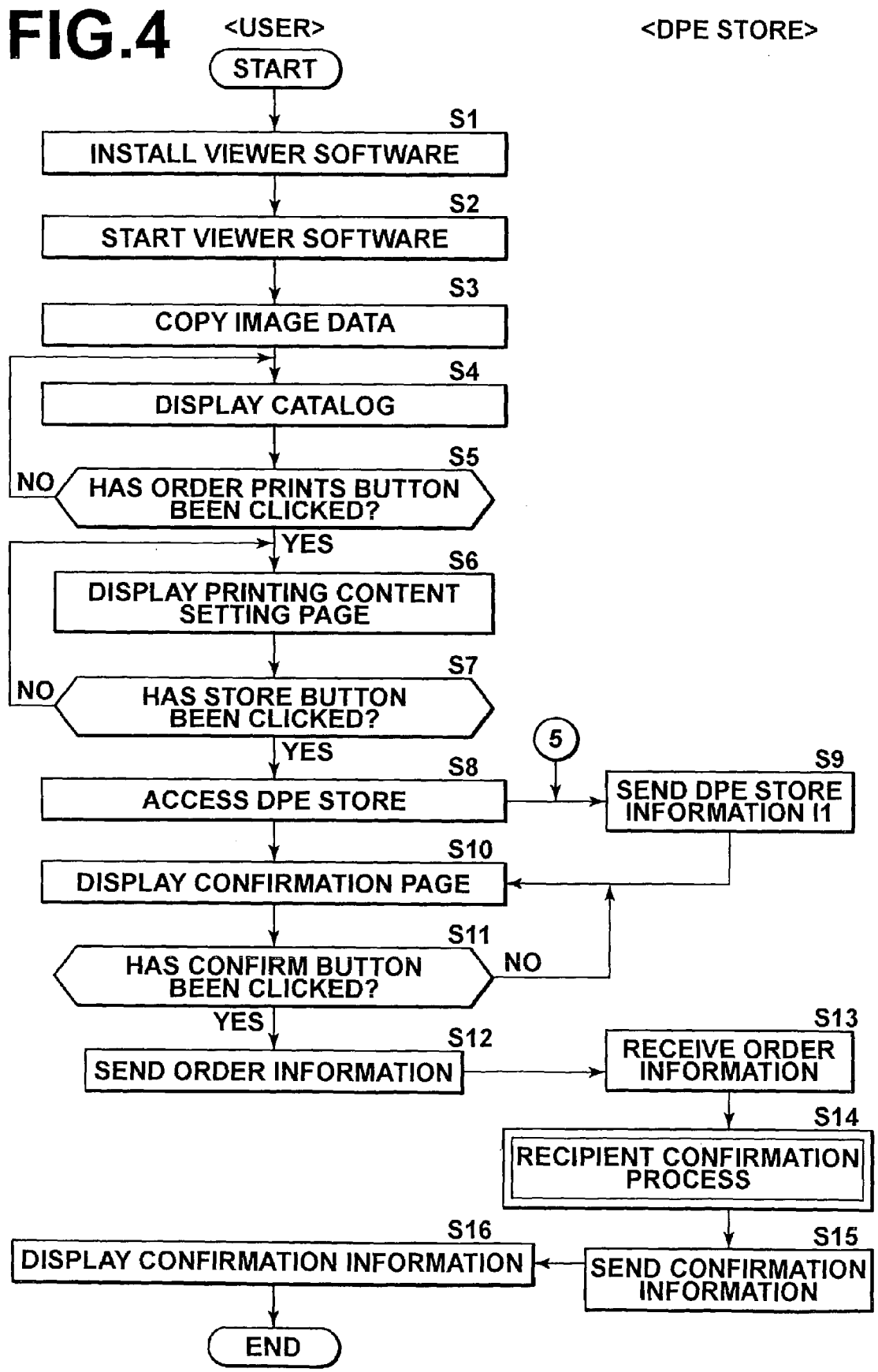
FIG. 4 is a flow chart showing the process carried out in the first embodiment.

The operation of the first embodiment will be explained next. FIG. 4 is a flow chart showing the process carried out in this embodiment. It is assumed that the user 1 has been provided with the CD-R recorded with the access information A of the DPE store 2 (hereinafter referred to as the DPE store A). In this example, ordinary printing (printing by the printer 22A of the digital mini-laboratory 22) of the image data sets S owned by the user 1 is carried out.

The user 1 installs the viewer software recorded in the CD-R in the user terminal 11 (Step S1). At this time, the access information A is input to the viewer software. The user 1 starts the viewer software (Step S2). The user 1 then sets the recording medium recorded with the image data sets S obtained by the digital camera in a PC card slot of the user terminal 11, and clicks a Copy button (not shown) of the viewer software so that the image data sets S in the recording medium are copied in the hard disc of the use terminal 11 (Step S3). At this time, a folder for storing the image data sets S is automatically generated. By selecting this folder and instructs catalog display, a catalog of thumbnail images of the image data sets S is displayed (Step S4).

Figure 5:
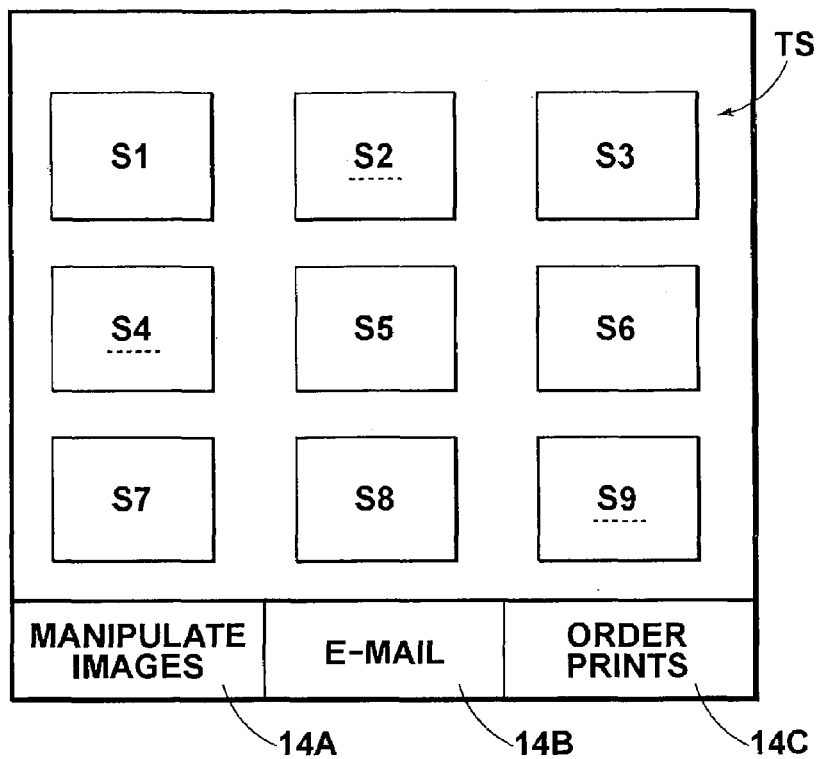
FIG. 5 shows a catalog display page.

FIG. 5 shows a catalog display page displayed on the user terminal 11. As shown in FIG. 5, in the catalog display page are shown thumbnail images TS of the image data sets S, a Manipulate Images button 14A for image manipulation, an E-mail button 14B for sending an image-attached e-mail message, and an Order Prints button 14C for ordering printing. Nine of the thumbnail images TS corresponding to nine of the image data sets S (hereinafter referred to as the image data sets S1 to S9) are shown in FIG. 5. By scrolling the catalog display page, more of the thumbnail images TS can be displayed. The Manipulate Images button 14A is used for trimming of images represented by the image data sets S, correction of brightness and colors thereof, and insertion of a caption or the like, for example. By clicking the Manipulate Images Button 14A after selection of one of the thumbnail images TS, the image represented by the corresponding one of the image data sets S can be manipulated.

One or more of the images to be printed (such as the images represented by the image data sets S2, S4, and S9) are then selected, and whether or not the Order Prints button 14C is clicked is judged (Step S5). If a result at Step S5 is affirmative, a printing content setting page is displayed (Step S6).

Figure 6:
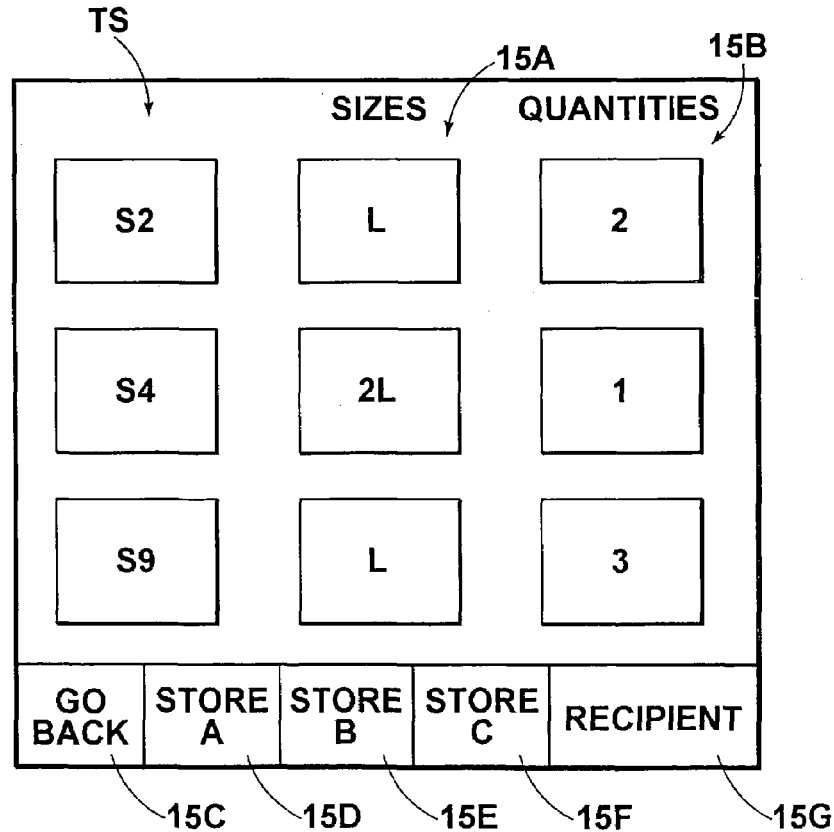
FIG. 6 shows a printing content setting page.

FIG. 6 shows the printing content setting page. As shown in FIG. 6, in the printing content setting page are displayed the thumbnail images TS of the image data sets S2, S4, and S9 selected in the catalog display page, print size input fields 15A and quantity input fields 15B for respectively inputting print sizes and quantities, a Go Back button 15C for returning to the catalog display page, Store buttons 15D to 15F for accessing the DPE store 2 to carry out the printing, and a Recipient button 15G for inputting recipient information.

As has been described above, the user 1 received the CD-R recorded with the access information A and the viewer software at the DPE store A, and installed the viewer software in the user terminal 11. Furthermore, the user 1 has placed print orders with DPE stores B and C. Therefore, the Store buttons 15D to 15F show the DPE stores A to C so that the user 1 can access one of these stores as the DPE store 2 to place the printing order with. The user 1 inputs the print sizes and the quantities in the print size input fields 15A and in the quantity input fields 15B in the printing content setting page, for the respective image data sets S that have been selected. Since only predetermined print sizes are available, the print size input fields 15A may comprise a pull-down menu. The user 1 can return to the catalog display page for image reselection by clicking the Go Back button 15C.

When the user 1 clicks the recipient button 15G, a recipient information setting page shown in FIG. 7 is displayed. As shown in FIG. 7, input fields 20A for inputting the name, the address (the street name, the city name, and the state name), and the phone number of the recipient, and an OK button 20B for confirming the content of the recipient information are displayed in the recipient information setting page. The user 1 inputs the recipient information in the recipient information setting page, and clicks the OK button 20B. In this manner, the recipient information is confirmed, and the recipient table is generated to be included in the order information C. In order to simplify the input of the recipient information, the recipient information that was used in the previous order is displayed in the recipient information setting page. Therefore, if the recipient is the same, the user 1 can immediately click the OK button 20B to confirm the recipient information.

In the case where the user 1 living in Tokyo wishes to send photographs (the prints P) of his/her child to his/her parents living in Hokkaido, it is more efficient to ask the parents to receive the prints P at a DPE store as an agency close to the parents' home than to mail the prints P to the parents after the user 1 receives the prints P. In this embodiment, the user 1 can set the recipient as he/she wishes. Therefore, the user 1 inputs information of his/her parents as the recipient information, and specifies the DPE store close to their home as the agency to place the printing order with. By letting the parents know of this fact, the parents can receive the photographs of their grandchild at the DPE store close to their place of residence.

Whether one of the Store buttons 15D to 15F has been clicked or not is then judged (Step S7). If a result at Step S7 is affirmative, the user terminal 11 accesses the order reception server 21 of the DPE store 2 corresponding to the Store button that has been clicked, by the function of the viewer software (Step S8). The selected DPE store is a DPE store at which the recipient input in the recipient information setting page can receive the prints P. For example, if the recipient is the user 1 and the DPE store at which the user 1 can receive the prints P is the DPE store A, the Store button 15D is clicked, and the order reception server 21 of the DPE store A is accessed. If the recipient is the parents of the user 1 and the DPE store at which the parents can receive the prints P is the store C, the Store button 15F is clicked and the order reception server 21 of the DPE store C is accessed.

After the access, the order reception server 21 sends the DPE store information I1 regarding the selected DPE store 2 to the user terminal 11 (Step S9). The DPE store information I1 may be sent automatically after the access or after an instruction input from the user terminal 11.

The user terminal 11 receives the DPE store information I1, and displays a confirmation page including the printing charge in accordance with the print sizes and the quantities as well as the expected time of delivery (Step S10). FIG. 8 shows the confirmation page. As shown in FIG. 8, the thumbnail images TS are displayed in the confirmation page, as in the printing content setting page. In addition, fields 16A and 16B for displaying the print sizes and the quantities for the respective images, a Go Back button 16C for returning to the printing content setting page, and a Confirm button 16D for confirming the order are displayed in the confirmation page.

The user 1 can confirm the printing charge and the time of delivery while viewing the confirmation page. If necessary, the user 1 can change the print sizes and the quantities by clicking the Go Back button 16C to display the printing content setting page again.

Whether or not the Confirm button 16D has been clicked is then judged (Step S11). If a result at Step S11 is affirmative, the order information C representing the content of the print order is sent to the order reception server 21 of the DPE store 2, together with the image data sets S to be printed (Step S12). The order information C includes the file names of the image data sets S, the print sizes, the print quantities, the information on the user 1 (such as the name, the address, and the phone number), and the recipient table. The order reception server 21 receives the order information C and the image data S (Step S13), and carries out recipient confirmation process (Step S14).

Figure 9:
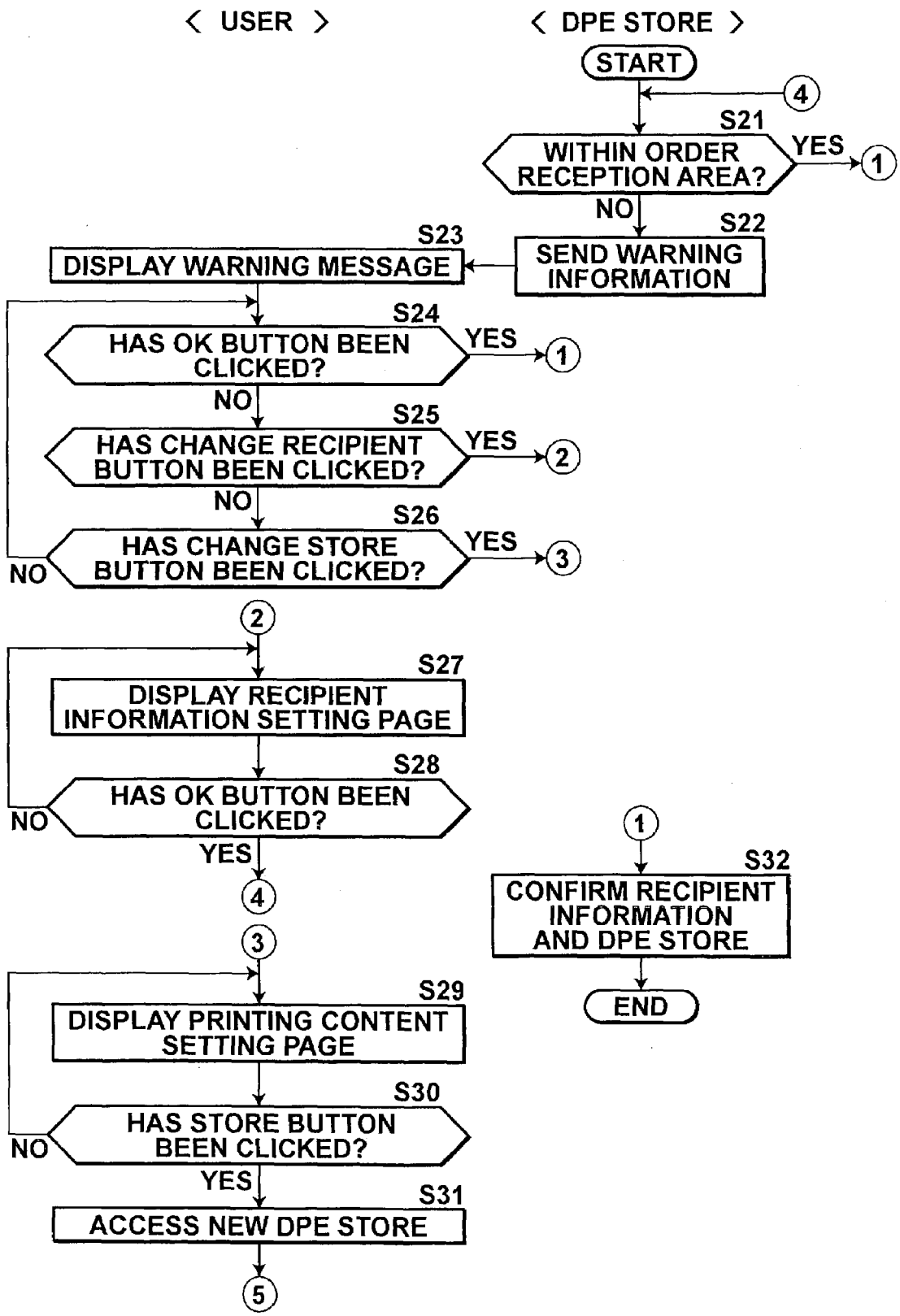
FIG. 9 is a flowchart showing the process for confirming a recipient.

FIG. 9 is a flow chart showing the recipient confirmation process. Whether or not the place of residence of the recipient is within the order reception area of the DPE store 2 is judged, with reference to the order reception area table in the database 26 and the recipient table included in the order information C (Step S21). If a result at Step S21 is affirmative, the recipient information and the DPE store 2 are confirmed (Step S32) to end the process. If the result at Step S21 is negative, the warning information K is sent to the user terminal 11 (Step S22). The user terminal 11 receives the warning information K, and the warning message is displayed on the monitor 12 of the user terminal 11 (Step S23).

In the case where the user 1 specified his/her parents as the recipient in the previous order but wishes to designate himself/herself as the recipient this time, the recipient information of the user 1 needs to be input in the recipient information setting page. However, in this embodiment, the recipient information in the previous order is displayed in the recipient information setting page, and the user 1 may place the print order with the DPE store A that is close to his/her home by clicking the OK button 20B while mistaking that the recipient information is his/her information. Likewise, in the case where the user 1 was the recipient in the previous order but the parents are the recipient in this order, the user 1 may place the print order with the DPE store C close to his/her parents' home without changing the recipient information.

For this reason, in this embodiment, whether or not the place of residence of the recipient is within the order reception area of the DPE store 2 is judged in the DPE store 2, with reference to the order reception area table T in the database 26 and the recipient information included in the recipient table. In the case where the place of residence is not within the order reception area, the warning information K is sent to the user terminal 11 to display the warning message on the monitor 12 so that the user 1 can be prompted to change the recipient information or the DPE store 2 to place the print order with.

Figure 10:
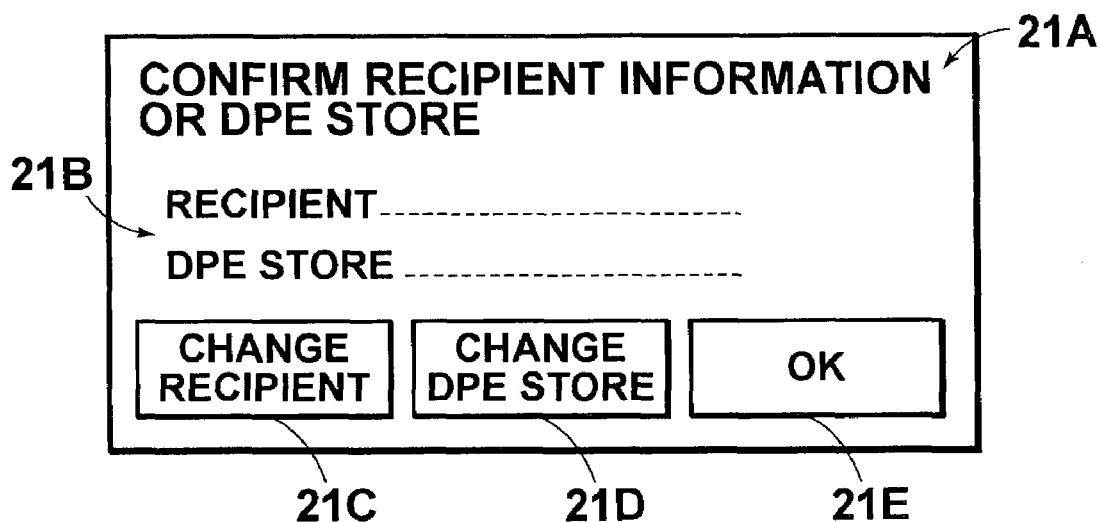
FIG. 10 shows a warning message display page.

FIG. 10 shows a warning message display page. As shown in FIG. 10, a warning message 21A reading "Confirm Recipient Information or DPE Store" is displayed in the warning message display page, in order to prompt the user 1 to change the recipient information or the DPE store 2. Furthermore, in the warning message display page are shown information 21B of the recipient and the DPE store 2 used in the print order, a Change Recipient button 21C for changing the recipient information, a Change DPE Store button 21D for changing the DPE store 2, and an OK button 21E for confirming the order without changing the recipient information and the DPE store.

In the case where the recipient information and the DPE store 2 do not need to be changed, the user 1 clicks the OK button 21E. Therefore, whether or not the OK button 21E has been clicked is then judged (Step S24). If a result at Step S24 is affirmative, information representing this affirmation is sent to the order reception server 21. The recipient information and the DPE store 2 are confirmed based on the affirmation information (Step S32) to end the process. If the result at Step S24 is negative, whether or not the Change Recipient button 21C has been clicked is judged (Step S25). If a result at Step S25 is affirmative, the recipient information setting page is displayed, as shown in FIG. 7 (Step S27). The user 1 can change the recipient information in the recipient information setting page. In this case, if the OK button 20B is clicked, only the recipient information is sent to the DPE store 2.

Whether the OK button 20B has been clicked after changing the recipient information is judged (Step S28). If a result at Step S28 is affirmative, the process returns to Step S21, and the procedures from Step S21 to Step S28 are then repeated. If the result at Step S28 is negative, the process returns to Step S27 to repeat the procedures from Step S27 to Step S28.

If the result at Step S25 is negative, whether or not the Change DPE Store button 21D has been clicked is then judged (Step S26). If a result at Step S26 is negative, the process returns to Step S24 to repeat the procedures from Step S24 to Step S26. If the result at Step S26 is affirmative, the printing content setting page shown in FIG. 6 is displayed (Step S29). The user 1 can change the DPE store 2 to place the print order with, by clicking one of the Store buttons 15D to 15F describing the names of the DPE stores in the printing content setting page. Whether one of the Store buttons has been clicked or not is judged (Step S30). If a result at Step S30 is affirmative, the access to the DPE store 2 specified before the change is disconnected, and the user terminal 11 accesses the order reception server 21 of the newly-designated DPE store 2 (Step s31). The order reception server 21 of the newly-designated DPE store 2 carries out the procedures from Step S9 in the flow chart shown in FIG. 4. If the result at Step S30 is negative, the process returns to Step S29 to repeat the procedures from Step S29 to S30. The process described above is carried out until the recipient confirmation process ends by affirmation at Step S21 or S24.

After the recipient confirmation process has been completed, confirmation information describing the order reception ID corresponding to the order information C, the printing charge, and the time of delivery is generated and sent to the user terminal 11, in order to confirm reception of the print order (Step S15). The time of delivery herein referred to is the time of completion of print generation that is determined with reference to the time of reception of the order information C by the order reception server 21. For example, in the case where the order information C is received within operating hours of the DPE store 2, the time of delivery is 3 hours after the time of reception. In the case where the order information C is received outside the operating hours, the time of delivery is the time when the DPE store opens on the next operating day. The confirmation information is displayed on the user terminal 11 (Step S16) to end the operation.

In the DPE store 2, the controller 23 regularly checks reception of the order information C by using the order reception server 21. In the case where the order information C has been received, an order reception sheet is printed to notify the operator of the reception. In the case where the expected time of delivery is three hours after reception of the order information C, for example, the operator checks reception of the order information C at intervals determined by subtracting the time necessary for processing from three hours (that is, every two hours if the time for processing is one hour). The operator uses the controller 23 to generate the prints P, based on the order information C sent to the order reception server 21. More specifically, the operator operates a starting switch (not shown) of the controller 23 so that the order information C and the image data sets S are sent from the order reception server 21 to the digital mini-laboratory 22. In this manner, the image data sets S are printed by the printer 22A of the digital mini-laboratory 22 according to the order information C, and the prints P are obtained. At this time, the order reception ID is printed on the backside of each of the prints P, and the prints P are sorted in order of reception of the order information C. The controller 23 also prints the user name, the content of printing, the printing charge, the order reception ID, and the like on the label KP, based on the order information C. The operator then pastes the label KP on the DP bag to contain the prints P, and puts the prints P in the DP bag corresponding to the order reception ID. The user 1 visits the DPE store 2 after the time of delivery, and receives the prints P by paying the charge. The prints P may alternatively be delivered or mailed to the user 1.

As has been described above, in this embodiment, the order reception server 21 judges whether or not the place of residence of the recipient is within the order reception area of the DPE store 2 for placing the print order with. If the result is negative, the warning information K is sent to the user terminal 11 so that the warning message is displayed on the monitor 12. Therefore, the user 1 can realize the fact that the recipient specified in the order information C or the DPE store 2 to which the order information C was sent may be wrong. In this case, the user 1 confirms the DPE store 2 and the recipient displayed together with the warning message, and can correct the DPE store or the recipient if the specified DPE store or the specified recipient is wrong. In this manner, the DPE store 2 or the recipient can be prevented from being specified by mistake before the user 1 visits the DPE store 2 to receive the prints P.

In the first embodiment, the DPE store 2 only has the digital mini-laboratory 22. Therefore, only printing of the image data sets S can be carried out therein. For this reason, it is preferable for the DPE store 2 to collaborate with a service provider that can carry out various services (such as picture postcard generation and printing on a T-shirt) so that the user 1 can be provided with those services.

In the first embodiment, the print order is placed with the DPE store 2. However, any printing service provider such as a laboratory specialized in printing without having a storefront can install the print order system of the present invention.

In the first embodiment, the warning message is displayed on the monitor 12 of the user terminal 11 according to the warning information K. However, the warning information K may be sent so as to reproduce an audio warning message or an audio warning message in addition to the warning message to be displayed.

In the first embodiment, the order information C is sent directly to the DPE store 2 that acts as the agency as well. However, as shown in FIG. 11, an order reception center 4 for dedicatedly receiving a print order may be used. The present invention can be applied to such a printing service system, and the order information C includes agency information and the recipient information to receive the prints P, in this case. The order information C is sent to an agency (such as a DPE store) 2A, 2B, or 2C specified in the agency information, and the prints P are generated in the agency. Hereinafter, this printing service system will be explained as a second embodiment of the present invention.

As shown in FIG. 11, the order reception center 4 has an order reception server 41 and a database 46 that are the same as the order reception server 21 and the database 26 in the first embodiment.

The database 46 stores the agency table T0 representing where each of agencies (such as a DPE store) in collaboration with the order reception center 4 is located, and the order reception area table T representing the order reception area of each of the agencies. When the order reception server 41 receives the order information C, the agency table T0 and the order reception area table T are referred to, in addition to the agency information and the recipient information included in the order information C. Whether or not the place of residence of the recipient is within the order reception area of the specified one of the agencies is then judged, and the warning message K is sent to the user terminal 11 to display the warning message on the monitor 12 in the case where a result of judgment is negative.

In the first and the second embodiments described above, whether or not the place of residence of the recipient is within the order reception area is judged based on the order reception are a table T stored in the data base 26 or 46. However, a distance between the agency and the recipient may be calculated based on the street names, the prefixes, the area codes, the zip codes, or the like of the agency and the recipient. By comparing the distance with a predetermined threshold value, whether or not the place of residence of the recipient is within the order reception area can be judged.

In this case, the distance may be a strict distance calculated based on the addresses. Alternatively, the distance may be a rough distance between centers of the streets, or a rough distance that is found based on the zip codes, for example.

What is claimed is:

1. A print order system comprising:
    an order reception server capable of receiving, via a network, image data and order information representing the contents of a print order regarding the image data and including recipient information representing a place of residence of a recipient of printed matter to be generated according to the content of the print order, said order reception server being provided at a photographic processing service provider that generates the printed matter based on the contents of the print order; and
    an order terminal connected to the order reception server via the network and used for placing the print order regarding the image data by generating the order information and then by sending the order information by accessing the order reception server, wherein
    the order reception server has the functions of judging whether the place of residence of the recipient is within an order reception area of the photographic processing service provider, based on the recipient information, prior to generating the printed matter, and sending warning information to the order terminal when the place of residence has been judged to be not within the order reception area, and
    the order terminal has a function of issuing a warning based on the warning information.

2. A printing system comprising an order reception server capable of receiving order information generated by an order terminal for placing a print order regarding image data via a network, the order information including the content of the print order regarding the image data in addition to recipient information representing a place of residence of a recipient of printed matter to be generated according to the content of the print order, said order reception server being provided at a photographic processing service provider that generates the printed matter based on the contents of the print order, wherein
    the order reception server has the functions of judging whether the place of residence of the recipient is within an order reception area of the photographic processing service provider, based on the recipient information, prior to generating the printed matter, and sending warning information to the order terminal when the place of residence has been judged to be not within the order reception area.

3. An order terminal connected to the order reception server in the printing system defined in claim 2 via the network and used for placing the print order regarding the image data by generating the order information and then by sending the order information by accessing the order reception server, wherein
    the order terminal has a function of issuing a warning based on the warning information sent from the order reception server.

4. A computer readable recording medium having stored therein a program that causes a computer to execute a procedure carried out in a printing system comprising an order reception server capable of receiving order information generated by an order terminal for placing a print order regarding image data via a network, the order information including the content of the print order regarding the image data in addition to recipient information representing a place of residence of a recipient of printed matter to be generated according to the content of the print order, said order reception server being provided at a photographic processing service provider that generates the printed matter based on the contents of the print order, the program comprising the steps of:
    judging whether or not the place of residence of the recipient is within an order reception area of the photographic processing service provider, based on the recipient information, prior to generating the printed matter, and
    sending warning information to the order terminal when the place of residence has been judged to be not within the order reception area.

5. A computer readable recording medium having recorded therein a program that causes a computer to execute the procedures carried out in the order terminal connected to the order reception server in the printing system defined in claim 2 via the network, the order terminal placing the print order regarding the image data by generating the order information and then by sending the order information by accessing the order reception server, the program comprising the step of:
    issuing a warning based on the warning information sent from the order reception server.

6. A print order system comprising:
    an order reception server capable of receiving, via a network, image data and order information representing the contents of a print order regarding the image data and including recipient information representing a place of residence of a recipient of printed matter to be generated according to the content of the print order and agency information representing an agency at which the printed matter is to be received by the recipient; and an order terminal connected to the order reception server via the network and used for placing the print order regarding the image data by generating the order information and then by sending the order information by accessing the order reception server, wherein the order reception server has the functions of judging whether the place of residence of the recipient is within an order reception area of the agency, based on the recipient information, prior to sending the image data and the order data to the agency represented by the agency information, and sending warning information to the order terminal when the place of residence has been judged to be not within the order reception area, and the order terminal has a function of issuing a warning based on the warning information.

7. A printing system comprising an order reception server capable of receiving order information generated by an order terminal for placing a print order regarding image data via a network, the order information including the content of the print order regarding the image data in addition to recipient information representing a place of residence of a recipient of printed matter to be generated according to the content of the print order and agency information representing an agency at which the printed matter is to be received by the recipient, wherein the order reception server has the functions of judging whether the place of residence of the recipient is within an order reception area of the agency, based on the recipient information, prior to sending the image data and the order data to the agency represented by the agency information, and sending warning information to the order terminal when the place of residence has been judged to be not within the order reception area.

8. An order terminal connected to the order reception server in the printing system defined in claim 7 via the network and used for placing the print order regarding the image data by generating the order information and then by sending the order information by accessing the order reception server, wherein the order terminal has a function of issuing a warning based on the warning information sent from the order reception server.

9. A computer readable recording medium having stored therein a program that causes a computer to execute a procedure carried out in a printing system comprising an order reception server capable of receiving order information generated by an order terminal for placing a print order regarding image data via a network, the order information including the content of the print order regarding the image data in addition to recipient information representing a place of residence of a recipient of printed matter to be generated according to the content of the print order and agency information representing an agency at which the printed matter is to be received by the recipient, the program comprising the steps of:

judging whether the place of residence of the recipient is within an order reception area of the agency, based on the recipient information, prior to sending the image data and the order data to the agency represented by the agency information; and sending warning information to the order terminal when the place of residence has been judged to be not within the order reception area.

10. A computer readable recording medium having recorded therein a program that causes a computer to execute the procedures carried out in the order terminal connected to the order reception server in the printing system defined in claim 7 via the network, the order terminal placing the print order regarding the image data by generating the order information and then by sending the order information by accessing the order reception server, the program comprising the step of:

issuing a warning based on the warning information sent from the order reception server.

* * * * *